Figure 1:
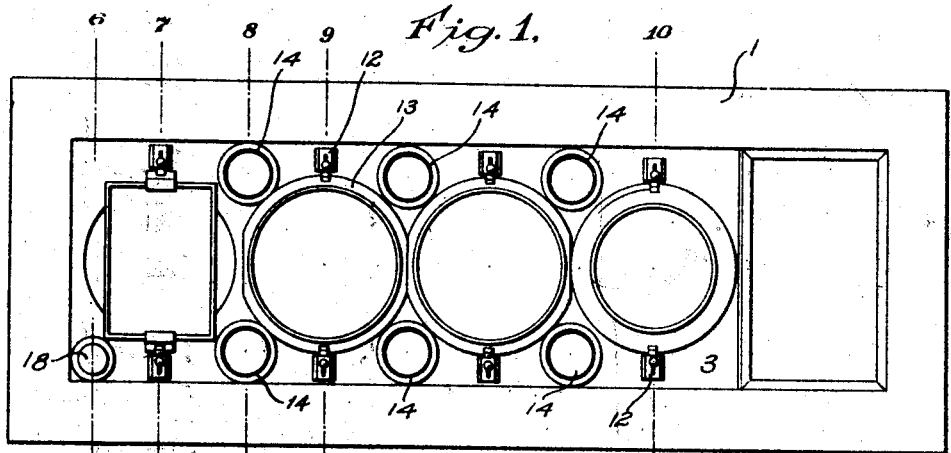

March 24, 1925.

J. E. OEST

ICE CREAM CABINET

Filed March 13, 1924

1,531,215

2 Sheets-Sheet 1

WITNESSES

INVENTOR
JOHN E. OEST
BY
ATTORNEYS

March 24, 1925.
J. E. OEST
1,531,215
ICE CREAM CABINET
Filed March 13, 1924   2 Sheets-Sheet 2
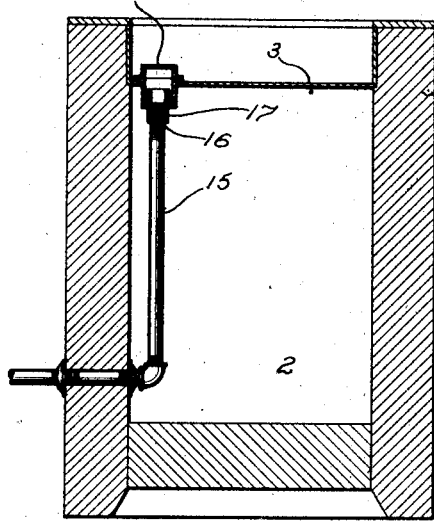
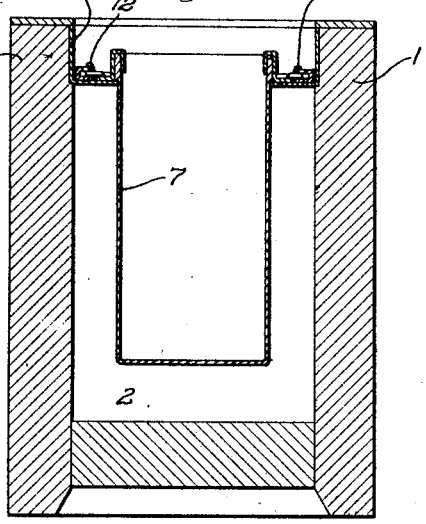
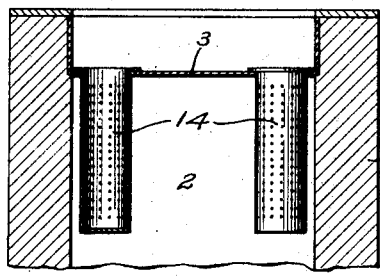
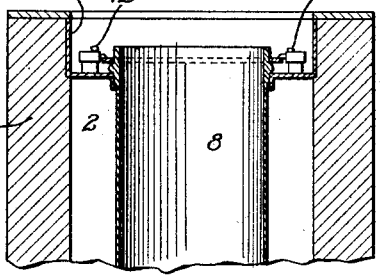
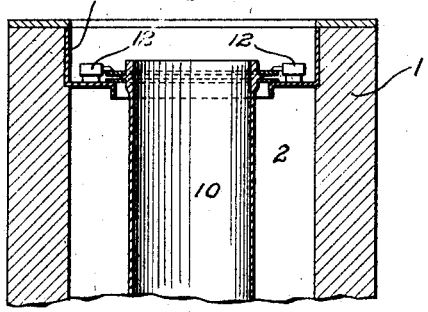
WITNESSES
INVENTOR
JOHN E. OEST
BY
ATTORNEYS Patented Mar. 24, 1925.

1,531,215

UNITED STATES PATENT OFFICE.

JOHN E. OEST, OF NEW YORK, N. Y.; MARY J. OEST EXECUTRIX OF SAID JOHN E. OEST, DECEASED.

ICE-CREAM CABINET.

Application filed March 13, 1924. Serial No. 699,034.

*To all whom it may concern:*

Be it known that I, JOHN E. OEST, a citizen of the United States, and a resident of the city of New York, borough of Manhattan, in the county and State of New York, have invented a new and Improved Ice-Cream Cabinet, of which the following is a full, clear, and exact description.

This invention relates to an ice cream cabinet, and has for an object the provision of a simple, efficient, strong and durable cabinet especially adapted for a quick and easy insertion of the ice cream containers into the cabinet and removal therefrom.

Another object concerns the provision of means whereby a very highly efficient freezing medium can be maintained around the containers at all times.

A further object concerns the provision of a construction which is very readily adaptable for the draining of the cabinet and for cleaning purposes.

A still further object concerns the provision of a construction whereby parts of the cabinet can be quickly disassembled with a minimum of expenditure of time and labor.

The invention is illustrated in the drawings, of which—

Figure 2:
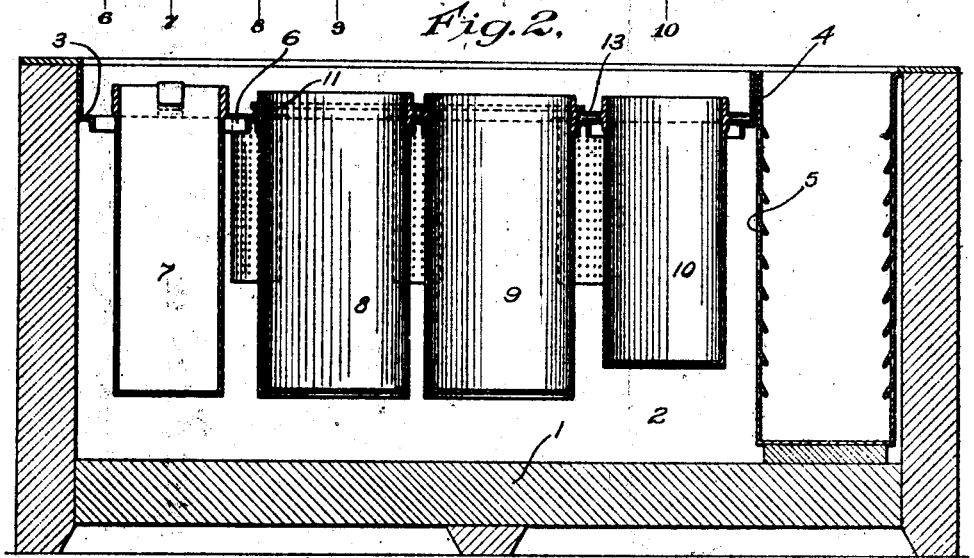
Figure 3:
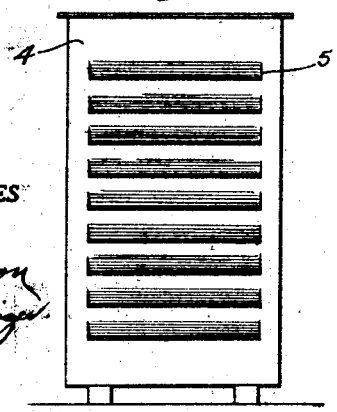
Figures 4, 5:
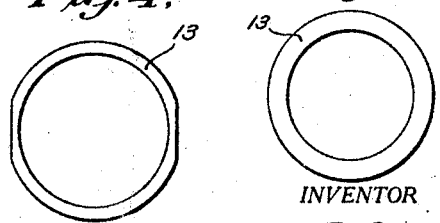

Figure 1 is a plan view of the device;
Fig. 2 is a longitudinal vertical section;
Fig. 3 is an elevation of the ice box;
Fig. 4 is a plan view of the top of one of the ice cream can retainer latch ring;
Fig. 5 is a plan view of the top of one of the ice cream can supporting rings;
Fig. 6 is a section taken on the line 6—6 of Fig. 1;
Fig. 7 is a section taken on the line 7—7 of Fig. 1;
Fig. 8 is a section taken on the line 8—8 of Fig. 1;
Fig. 9 is a section taken on the line 9—9 of Fig. 1; and
Fig. 10 is a section taken on the line 10—10 of Fig. 1.

The form of the invention shown in the drawings is a preferred form, although it is understood that modifications in the construction and arrangement of the parts and in the character of the materials used may be adopted without departing from the spirit of the invention as set forth in the appended claims.

The invention concerns the provision of an ice cream cabinet which is adapted to receive a body of freezing liquid, such as a brine solution, into which the ice cream cans depend. These cans are supported on a plate which extends across the top of the cabinet. This plate is provided with apertures through which the cans extend and from which they are supported. Preferably at one end of the cabinet is disposed a perforated ice box which can be readily placed in the cabinet and as easily removed therefrom. This box is adapted to contain ice and, because of the perforations in it, is in contact with the brine solution at all times. Also supported from the plate extending across the top of the cabinet are a plurality of perforated containers holding salt, so that the salt goes into the solution in the cabinet as fast as it is desired. Associated with the plate, adjacent the various cans of ice cream, are latching means so that as the can is supported on the plate it is latched thereon, but the latching means are so constructed as to permit the ready and simple assembly of the cans as desired. A further construction involves the provision of an overflow pipe whereby the level of the brine solution in the cabinet can be maintained at the desired height.

As shown in the drawings, the preferred form of the invention includes a cabinet 1, of any suitable material, within which a chamber 2 is formed. This chamber is adapted to be filled to a given level with liquid, such as water. The top of the cabinet is provided with a plate 3 which is suitably fastened thereto and extends substantially across the entire cabinet except at one end, into which end an ice box 4 is introduced. This box is provided with perforations such as 5 formed by slitting the material of the box and bending the slitted portions away from the main body. This box is readily insertable in the cabinet and can be removed by merely lifting it out of the cabinet. This box is adapted to contain ice, which by reason of the perforations 5 is in contact with the solution in the cabinet at all times. The plate is provided with a plurality of apertures 6 from which cans such as 7, 8 and 9 are supported. The can 10 is smaller than the cans 8 and 9, and a can-supporting ring such as 13ª, shown in Fig. 5, is disposed below the bead on the can so as to support the can therefrom, the ring itself resting on the edges of the aperture in the plate 3.

Adjacent each can are disposed latching means, such as 12, which engage with ring-shaped flanges 13 on the upper edges of each can to hold the cans in place. These latches are of any suitable type and can be withdrawn at will to permit the can to be lifted out of the cabinet. The plate 3 is also provided with apertures through which perforated salt containers such as 14 are introduced. These containers are adapted to depend into the liquid formed in the chamber 2 beneath the plate 3 and the salt therein goes into solution as rapidly as desired. It will be noted that the container 7 is preferably rectangular in shape and is, therefore, adapted to contain brick ice cream. This container is also provided with latching means similar to those mentioned. This aperture is, however, adapted also to hold round cans of any size. By using the supporting rings 13ª and the retaining ring 13, cans smaller in diameter than the aperture can be supported therein.

An overflow pipe 15 extends into the chamber 2 and the upper end of it is disposed beneath the plate 3. This pipe is threaded at its upper end 16 and provided with an adjustable threaded sleeve 17 the height of the upper end of which can be adjusted to regulate the desired level of the brine solution within the cabinet. The plate 3 is provided with an aperture immediately above the upper end of the discharge pipe 15 and this aperture is normally closed by a cover 18 which, however, can be readily removed to expose the end of the discharge pipe so that the sleeve 17 can be easily adjusted and also for the purpose of cleaning out the discharge pipe.

It will be readily observed that I have provided a simple and efficient construction whereby ice cream cans of various kinds can be readily supported and depended into a brine solution in an ice cream cabinet. The ice can be readily supplied to the cabinet without disturbing the other parts of the device. Likewise the salt can be replenished from time to time without interfering with the disposition of the other parts. The ice cream cans are readily supported in place and can be easily removed at will. The fact that the freezing is achieved by means of a brine solution makes it unnecessary to pack the cabinet with ice each time the cans are replenished and new cans are placed in.

What I claim is:—

1. An ice cream cabinet, which comprises a receptacle containing a chamber adapted to receive a liquid, an apertured plate extending across the top of said receptacle, certain of said apertures adapted to receive ice cream cans therein dependent into the chamber and supported on said plate, a perforated salt container adapted to be disposed in one of said apertures to depend into the liquid in the chamber, and a perforated ice-receiving box disposed in said receptacle.

2. An ice cream cabinet, which comprises a receptacle having a chamber adapted to contain liquid, an apertured plate extending across the top of said receptacle to receive ice cream cans dependent into the liquid, and a perforated ice box disposed within said chamber, said ice box being separate and removable from said chamber.

3. An ice cream cabinet, which comprises a receptacle having a chamber therein, an apertured plate extending across the top of the chamber, an ice cream can having a flange thereon adapted to depend through said aperture and be supported on the plate by said flange, and latching means on the plate to engage with the flange to hold the can on the plate.

4. An ice cream cabinet, which comprises a receptacle having a chamber, a perforated ice box removably disposed in said chamber at one end thereof, said chamber adapted to receive liquid, and a perforated salt container to be supported within said chamber and dependent into said liquid.

JOHN E. OEST.